United States Patent
Wilking et al.

(10) Patent No.: US 9,922,087 B2
(45) Date of Patent: Mar. 20, 2018

(54) EFFICIENT QUERY OPTIMIZATION FOR SELECTIVE USE OF STRUCTURE ELEMENTS

(71) Applicants: Michael Wilking, Zuzenhausen (DE); Stefan Dipper, Wiesloch (DE)

(72) Inventors: Michael Wilking, Zuzenhausen (DE); Stefan Dipper, Wiesloch (DE)

(73) Assignee: SAP SE, Walldorf (DE)

( * ) Notice: Subject to any disclaimer, the term of this patent is extended or adjusted under 35 U.S.C. 154(b) by 264 days.

(21) Appl. No.: 14/321,457

(22) Filed: Jul. 1, 2014

(65) Prior Publication Data

US 2016/0004746 A1 Jan. 7, 2016

(51) Int. Cl.
G06F 17/30 (2006.01)

(52) U.S. Cl.
CPC .............. G06F 17/30454 (2013.01)

(58) Field of Classification Search
CPC .......... G06F 7/30442; G06F 17/30554; G06F 17/30454
See application file for complete search history.

(56) References Cited

U.S. PATENT DOCUMENTS

| | | | |
|---|---|---|---|
| 7,263,520 B2 | 8/2007 | Biedenstein et al. | |
| 7,356,524 B2 | 4/2008 | Zurek et al. | |
| 7,383,513 B2 * | 6/2008 | Goldberg .......... | G06F 17/30398 707/999.001 |
| 7,593,957 B2 | 9/2009 | Biedenstein et al. | |
| 7,620,642 B2 | 11/2009 | Zurek et al. | |
| 7,650,326 B2 | 1/2010 | Biedenstein et al. | |
| 7,668,803 B2 | 2/2010 | Zurek et al. | |
| 7,720,803 B2 | 5/2010 | Unnebrink et al. | |
| 7,739,285 B2 | 6/2010 | Faerber et al. | |
| 7,865,780 B2 | 1/2011 | Dipper et al. | |
| 7,996,633 B2 | 8/2011 | Zimmerer et al. | |
| 8,032,520 B2 | 10/2011 | Dipper et al. | |
| 8,046,275 B2 * | 10/2011 | Simon .................. | G06Q 10/087 705/28 |
| 8,073,834 B2 * | 12/2011 | Faerber ............. | G06F 17/30501 707/708 |

(Continued)

OTHER PUBLICATIONS

U.S. Appl. No. 14/152,122, filed Jan. 10, 2014, Schroetel et al.

*Primary Examiner* — Robert Beausoliel, Jr.
*Assistant Examiner* — Hau H Hoang
(74) *Attorney, Agent, or Firm* — Fish & Richardson P.C.

(57) ABSTRACT

The disclosure generally describes computer-implemented methods, software, and systems for generating and executing queries. A query is received. A set of structure elements associated with the query is determined, wherein the structure elements are used for accessing, in a database, data tuples associated with the set of structure elements. Optionally, the set of structure elements is reduced for accessing data tuples to the structure elements selected. Contributing structure elements are added to the reduced set to not produce objects in the result set but for creating associated objects. Contributing structure elements are handled in an optimized way to keep the data set on which the query result set is calculated as small as possible. This is done by using the smallest set of characteristics in the group-by clause for retrieving the data set to calculate the requested set of structure elements. A result set of the query is provided.

20 Claims, 2 Drawing Sheets

(56) References Cited

U.S. PATENT DOCUMENTS

| | | | |
|---|---|---|---|
| 8,108,419 B2* | 1/2012 | Hampton | G06F 17/30442 |
| | | | 707/769 |
| 8,135,665 B2 | 3/2012 | Wilking et al. | |
| 8,161,070 B2 | 4/2012 | Dipper | |
| 8,250,576 B2* | 8/2012 | Yildiz | G06F 9/461 |
| | | | 712/224 |
| 8,650,181 B2* | 2/2014 | Dipper | G06F 17/30436 |
| | | | 707/714 |
| 8,655,923 B2 | 2/2014 | Zurek et al. | |
| 8,666,968 B2 | 3/2014 | Sachs et al. | |
| 2003/0185250 A1 | 10/2003 | Harberts et al. | |
| 2005/0192941 A1 | 9/2005 | Biedenstein et al. | |
| 2005/0192942 A1 | 9/2005 | Biedenstein et al. | |
| 2008/0288446 A1* | 11/2008 | Hu | G06F 17/30536 |
| 2013/0238637 A1* | 9/2013 | Gupte | G06F 17/30451 |
| | | | 707/752 |
| 2013/0318030 A1 | 11/2013 | Nagel et al. | |
| 2014/0108331 A1 | 4/2014 | Dipper | |
| 2014/0372368 A1* | 12/2014 | Schroetel | G06F 17/30489 |
| | | | 707/603 |

* cited by examiner

US 9,922,087 B2

EFFICIENT QUERY OPTIMIZATION FOR SELECTIVE USE OF STRUCTURE ELEMENTS

TECHNICAL FIELD

The present disclosure relates to computer-implemented methods, software, and systems for generating and executing queries.

BACKGROUND

Users can use database queries, for example, to access specific information in a database. For example, databases can be relational, hierarchical, in other forms or structures, and/or some combination thereof. Query languages can use standard commands, including structured query language commands that provide a level of abstraction and ease-of-use for users to identify the information to be queried. For example, users can enter and modify queries manually. Further, queries can be generated automatically based on user selections, e.g., from user interfaces that allow a user to identify particular fields and/or information to be displayed and conditions and/or parameters for identifying the information.

Some queries, depending on their scope and structure, can be quite complex. Further, some queries can become inefficient and/or may require a significant amount of execution time for the query to run. For example, some queries may perform JOINs of tables or other structures, and some query processing can result in large numbers of tuples of information being accessed, e.g., when Cartesian products occur. Other query inefficiencies may exist.

SUMMARY

The disclosure generally describes computer-implemented methods, software, and systems for generating and executing queries. As an example, a query is received. A set of structure elements associated with the query is determined, wherein the structure elements are used for accessing, in a database, data tuples associated with the set of structure elements. Optionally, the set of structure elements is reduced for accessing data tuples to the structure elements selected. Contributing structure elements are added to the reduced set to not produce objects in the result set but for creating associated objects. Contributing structure elements are handled in an optimized way to keep the data set on which the query result set is calculated as small as possible. A result set of the query is provided.

The present disclosure relates to computer-implemented methods, software, and systems for generating and executing queries. One computer-implemented method includes: receiving a query; determining a set of structure elements associated with the query, wherein the structure elements are used for accessing, in a database, data tuples associated with the set of structure elements; optionally reducing the set of structure elements for accessing data tuples to the structure elements selected; adding contributing structure elements to the reduced set to not produce objects in the result set but for creating associated objects; handling the contributing structure elements in an optimized way to keep the data set on which the query result set is calculated as small as possible; and providing a result set of the query.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect combinable with any of the previous aspects, reducing the set of structure elements includes removing superfluous structure elements that have no contribution in producing objects in the potential result set.

In a second aspect combinable with any of the previous aspects, a structure element can contain either a key figure and/or a selection on one or multiple characteristics or a formula wherein formula operands are other structure elements.

In a third aspect combinable with any of the previous aspects, an exception aggregation can be defined for a formula.

In a fourth aspect combinable with any of the previous aspects, the query is generated from user selections in a graphical user interface for formulating and modifying queries.

In a fifth aspect combinable with any of the previous aspects, executing the query includes using a selective use of structure elements setting that is set when executing the query is to be optimized by accessing the data tuples with the smallest set of characteristics in a group-by clause needed for object creation of the selected structure elements.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes computer-implemented methods, software, and systems for generating and executing queries. For example, a set of structure elements associated with the query is determined, wherein the structure elements are used for accessing, in a database, data tuples associated with the set of structure elements. Optionally, the set of structure elements is reduced for accessing data tuples to the structure elements selected. Contributing structure elements are added to the reduced set to not produce objects in the result set but for creating associated objects. Contributing structure elements are handled in an optimized way to keep the data set on which the query result set is calculated as small as possible. A result set of the query is provided.

The subject matter described in this specification can be implemented in particular implementations so as to realize one or more of the following advantages. Optimizing queries through optimized selection and use of structure elements saves execution time. Other advantages will be apparent to those skilled in the art.

Figure 1:
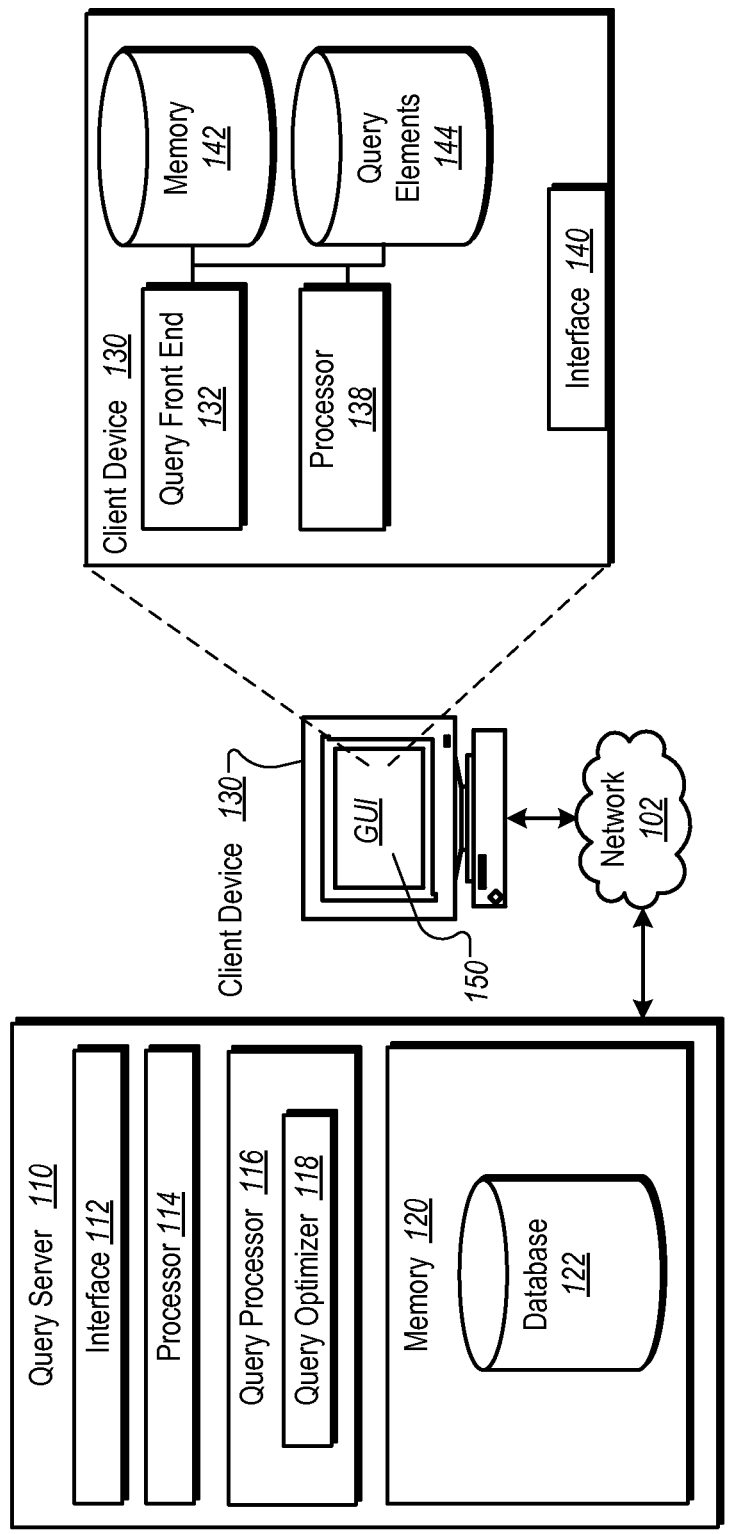
FIG. 1 illustrates an example environment for generating and executing queries according to an implementation.

FIG. 1 illustrates an example environment 100 for generating and executing queries according to an implementation. Specifically, the illustrated environment 100 includes at least one query server 110, and at least one client device 130, all of which are communicably coupled using a network 102. For example, a user interacting with a user interface presented on the client device 130 may enter or otherwise formulate queries for execution by the query server 110.

The query server 110 comprises an electronic computing device operable to execute received queries to provide result sets from information in the database 122. The database 122 may be accessible to one or more client devices 130, e.g., for executing queries using query front ends 132 or for other purposes.

As used in the present disclosure, the term "computer" is intended to encompass any suitable processing device. For example, although FIG. 1 illustrates a single query server 110, the environment 100 can be implemented using two or more query servers 110. The environment 100 can also be implemented using computers other than servers, including a server pool. Indeed, components of the environment 100 may be any computer or processing device. In other words, the present disclosure contemplates computers other than general purpose computers, as well as computers without conventional operating systems. Further, illustrated components of the environment 100 may be adapted to execute any operating system. According to some implementations, components of the environment 100 may also include, or be communicably coupled with, an e-mail server, a Web server, a caching server, a streaming data server, and/or other suitable server(s). In some implementations, components of the environment 100 may be distributed in different locations and coupled using the network 102.

The query server 110 includes an interface 112, a processor 114, a query processor 116, and a memory 120. The interface 112 is used by the query server 110 for communicating with other systems in a distributed environment, connected to the network 102 (e.g., the client device 130), as well as other systems (not illustrated) communicably coupled to the network 102. Generally, the interface 112 comprises logic encoded in software and/or hardware in a suitable combination and operable to communicate with the network 102. More specifically, the interface 112 may comprise software supporting one or more communication protocols associated with communications such that the network 102 or interface's hardware is operable to communicate physical signals within and outside of the illustrated environment 100. The processor 114, for example, can process instructions of the query server 110, including the query processor 116.

The query processor 116, for example, can receive and process queries received from systems and/or devices external to the query server 110. For example, the query processor 116 can handle queries received from the client device 130 that query information from the database 122. In response to each request, for example, the query processor 116 can provide query results (e.g., result sets) that are responsive to the request.

In some implementations, the query processor 116 includes a query optimizer 118. For example, the query optimizer 118 can be used for optimizing queries before they are executed and as they are executed. For example, the query optimizer can remove structure elements from a query that do not contribute to the result sets of the query. Further, the query optimizer 118 can treat certain parts of a query (e.g., not-selected structure elements with object creation, described below) in a special way.

A query front end 132 at the client device 130 can facilitate formulation of queries by a user. For example, the query front end 132 can perform the processing at the client device 130 that is needed to present a graphical user interface for using controls and making selections that are used to formulate a query, modify an existing query, or select an existing query. To obtain inputs relative to query formulation, modification or selection, for example, the query front end 132 can provide a series of controls on the client device 130. The query front end 132 can also include controls for submitting queries and/or to designate databases that are to be the subject of the queries. The query front end 132 can also display the results of the queries, e.g., displaying a result set for each query submitted.

The query server 110 also includes the memory 120, or multiple memories 120. The memory 120 may include any type of memory or database module. The memory 120 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the query server 110. Additionally, the memory 120 may include any other appropriate data, such as VPN applications, firmware logs and policies, firewall policies, a security or access log, print or other reporting files, as well as others. In some implementations, memory 120 includes the database 122 (described above). Other components within the memory 120 are possible. The database 122 may not be part or the query server 110, but may be located on one or multiple servers that are connected to the query server 110 via the network 102.

The illustrated environment of FIG. 1 also includes the client device 130, or multiple client devices 130. The client device 130 may be any computing device operable to connect to, or communicate with, at least the query server 110 over the network 102 using a wire-line or wireless connection. In general, the client device 130 comprises an electronic computer device operable to receive, transmit, process, and store any appropriate data associated with the environment 100 of FIG. 1.

The illustrated client device 130 further includes an interface 140, a processor 138, and a memory 142. The interface 140 is used by the client device 130 for communicating with other systems in a distributed environment— including within the environment 100—connected to the network 102, e.g., the query server 110, as well as other systems communicably coupled to the network 102 (not illustrated). Generally, the interface 140 comprises logic encoded in software and/or hardware in a suitable combination and operable to communicate with the network 102. More specifically, the interface 140 may comprise software supporting one or more communication protocols associated with communications such that the network 102 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 130 includes the processor 138. Although illustrated as the single processor 138 in FIG. 1, two or more processors 138 may be used according to particular needs, desires, or particular implementations of the environment 100. Generally, the processor 138 executes instructions and manipulates data to perform the operations of the client device 130. Specifically, the processor 138 executes the functionality required to send requests to, and process responses from, and the query server 110.

The illustrated client device 130 also includes a memory 142, or multiple memories 142. The memory 142 may include any memory, database module, or any other suitable local or remote memory component. The memory 142 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 130. Additionally, the memory 142 may include any other appropriate data, such as VPN applications, firmware logs and policies, firewall policies, a security or access log, print or other reporting files, as well as others.

The illustrated client device 130 is intended to encompass any computing device such as a smart phone, tablet computing device, PDA, desktop computer, laptop/notebook computer, wireless data port, one or more processors within these devices, or any other suitable processing device. For example, the client device 130 may comprise a computer that includes an input device, such as a keypad, touch screen, or other device that can accept user information, and an output device that conveys information associated with the client device 130, including digital data, visual information, or a graphical user interface (GUI) 150, as shown with respect to and included by the client device 130.

In some implementations, a query processed by a query processor 116 can contain one or more structures. Each element of a structure can contain either one key figure and selections on multiple characteristics, or a formula with optional exception aggregation, wherein formula operands can be other structure elements. A key figure is a numerical value and can have a currency or unit of measure. Key figures are also called measures. Characteristics are also called dimensions. In case of exception aggregation a certain aggregation rule is defined for a certain characteristic. The formula is calculated before aggregating over this characteristic and the formula results are aggregated by the aggregation rule.

In some implementations, when multiple structures exist for a query, the Cartesian product of the structures can be built to generate a result set for the query.

The query processor 116 can request data from the database, at least in the granularity of the characteristics in drill-down elements, and can calculate the structure elements based on this data. This means that the result set of a query normally only contains tuples of the characteristics in drill-down elements, for which data is returned from the database (e.g., including posted or booked data). The generation of objects in the result set of a query therefore depends on the data returned from the database.

Consider Table 1, containing the following data set, containing data applicable to examples below:

TABLE 1

Data Set

| Country | Seller | Product | Turn | Revenue |
|---|---|---|---|---|
| DE | Fritz | Table | 5 | 3 |
| DE | Hans | Chair | 2 | 1 |
| DE | Hans | Table | 4 | 3 |
| DE | Arthur | Pen | 2 | 1 |
| US | George | Chair | 3 | 1 |
| US | Jack | Chair | 2 | 1 |
| US | Jack | Table | 2 | 1 |

For example, for a given query, a structure on the columns can be defined. The structure can contain, for example, two elements, each consisting of one key figure (i.e., Turn and Revenue). The characteristics Country and Seller can be drilled on the rows, as shown in the result set of Table 2:

TABLE 2

Result Set

| Country | Seller | Turn | Revenue |
|---|---|---|---|
| DE | Fritz | 5 | 3 |
|  | Hans | 6 | 4 |
|  | Arthur | 2 | 1 |
|  | Total | 13 | 8 |
| US | George | 3 | 1 |
|  | Jack | 4 | 2 |
|  | Total | 7 | 3 |
| Total |  | 20 | 11 |

Figure 2:
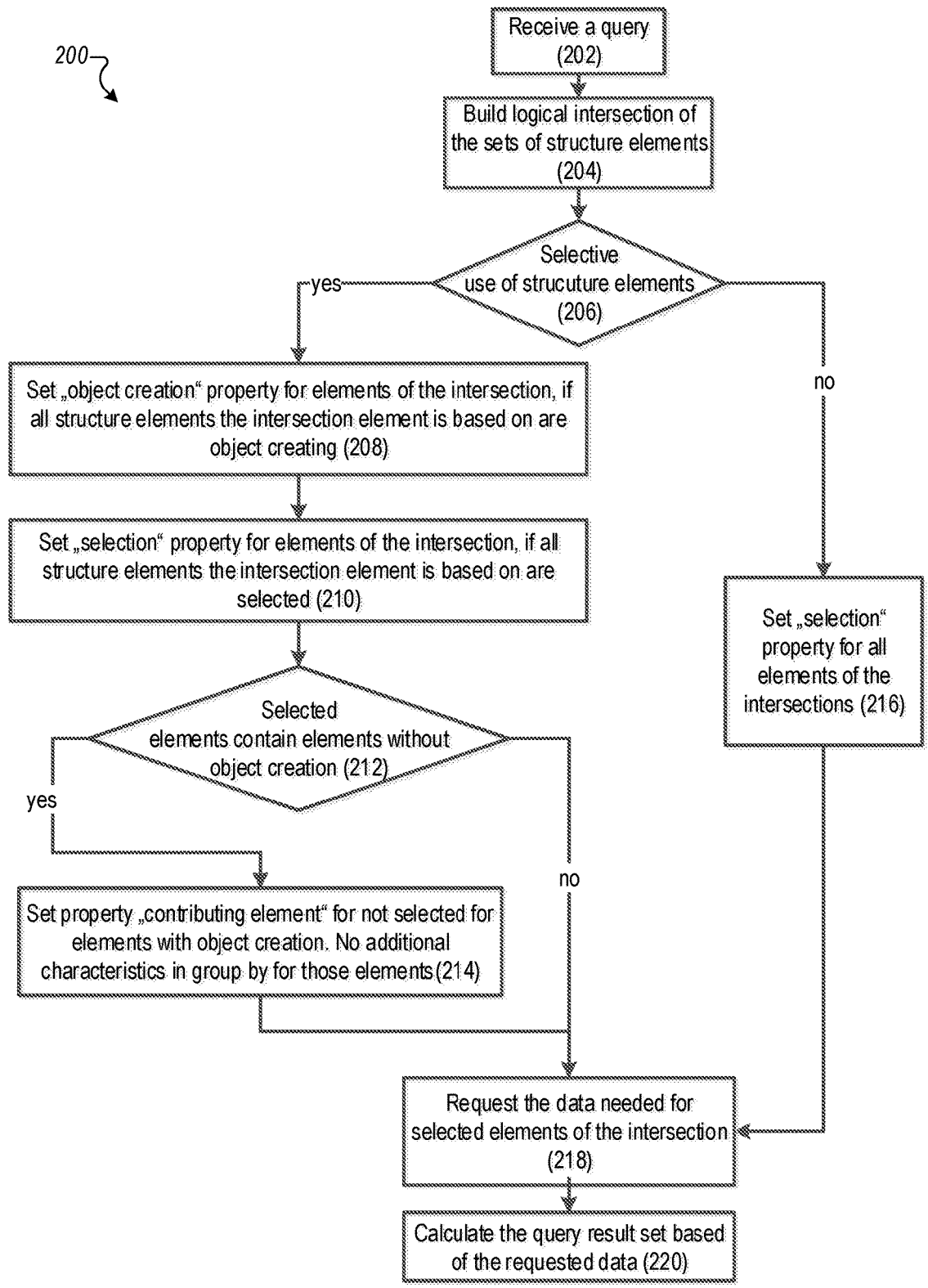
FIG. 2 is a flowchart of an example method for generating and executing queries according to an implementation.

When multiple structures exist for the query, for example, the query processor 116 can calculate the intersection of the structure elements of the different structures for all characteristics in drill-down elements. For example, for a given query that produces the result set shown in Table 3, the structure on the columns can contain elements with a selection of a key figure. The structure on the rows can contain elements with a selection of one value of a characteristic. The characteristic Product, for example, can be drilled in the rows. Only the products "Chair" and "Table" are shown in the query result set, because no data for the product "Pen" is retrieved from the database. The reason is that no data for the product "Pen" exists for selections of the structure elements "Country=US" or "Seller=Hans". The query processor and the query optimizer work on the intersection and not on the individual structures. For an easier explanation the following examples explain the logic for only one structure. FIG. 2 describes the logic for multiple structures.

TABLE 3

| | Result Set | | |
|---|---|---|---|
| Product | | Turn | Revenue |
| Chair | Country = US | 5 | 2 |
| | Seller = Hans | 2 | 1 |
| Table | Country = US | 2 | 1 |
| | Seller = Hans | 4 | 3 |
| Total | Country = US | 7 | 3 |
| | Seller = Hans | 6 | 4 |

In some implementations, it is possible to define a selection on the elements of a structure. For performance reasons, for example, it makes sense that the query processor 116 retrieves data only for the selected structure elements from the database. This optimization needs to be applied of course only if the selected structure elements are a subset of the structure elements of the query. However, if data is retrieved only for the selected structure elements, then less tuples of the characteristics in the drill-down elements may be shown. Therefore, it has to be defined if the query processor 116 retrieves data for all structure elements or only for the selected structure elements. Retrieving data only for the selected structure elements is called "selection of structure elements" (e.g., triggered using a "selective use of structure elements" setting).

For example, as shown in the result set of Table 4, the elements of the structure can contain a selection of the key figure Turn and a value of the characteristic Seller, e.g. "Turn (Seller=George)" and "Turn (Seller=Fritz)". The characteristic product is in the drill-down elements.

TABLE 4

| | Result Set | |
|---|---|---|
| Product | Turn (Seller = George) | Turn (Seller = Fritz) |
| Chair | 3 | |
| Table | | 5 |
| Total | 3 | 5 |

Now assume that a selection on the structure containing only the element "Turn (Seller=George)" is defined, as shown in the result set of Table 5. If the "selective use of structure elements" setting isn't used, then still data for both structure elements "Turn (Seller=George)" and "Turn (Seller=Fritz)" is requested by the query processor 116 from the database 122. Consequently, the database 122 returns data for the products "Chair" and "Table" to the query processor 116. Therefore, the query processor 116 can generate objects for "Table" and "Chair" in the result set, regardless of whether objects exist (e.g., no objects exist for the product Table for the structure element "Turn (Seller=George)".

TABLE 5

| | Result Set |
|---|---|
| Product | Turn (Seller = George) |
| Chair | 3 |
| Table | |
| Total | 3 |

If the "selective use of structure elements" setting is used, then data only for the structure element "Turn (Seller=Goerge")" is requested by the query processor 116 from the data base. The database 122 returns only data for the product "Chair" to the query processor 116. Therefore the query processor 116 can generate objects only for "Chair" in the result set. The product "Table" is missing in the result set, but this doesn't matter in the most use cases, as shown in the result set of Table 6.

TABLE 6

| | Result Set |
|---|---|
| Product | Turn (Seller = George) |
| Chair | 3 |
| Total | 3 |

In the example result set of Table 5, the structure element "Turn (Seller=George)" generates result set objects for the value "Chair" of the characteristic "Product". The not selected structure element "Turn (Seller=Fritz)" generates the result set objects for the value "Table" of the characteristic "Product".

Some implementations include structure elements without object generation, e.g., that are a special kind of structure elements that do not generate objects in the result set. For example, data for these structure elements can be retrieved separately from the database, and the retrieved data can be filled into the result set objects created by the other structure elements. Structure elements with constant selection are one example for such structure elements.

In some implementations, from a relational point of view, the query processor 116 can perform a left outer join between the database result set for the structure elements with object creation and the database result set for the structure elements without object creation.

If only structure elements without object generation are selected, then the result set will be empty. If a subset of the structure elements with object generation is selected, then populated objects for structure elements without object creation may disappear. This invention describes an efficient way how it can be avoided that populated objects for structure elements without object creation disappear. When populated objects disappear, the user may not be able to derive certain information from the result set. Referring to the result set of Table 7, for example, the purpose of the query used in this example can be to analyze the contribution of the sellers Fritz and Hans to the overall turn. A structure element with constant selection is used, for example, to show the overall turn in the result set.

TABLE 7

| | Result Set | | |
|---|---|---|---|
| Product | Turn (Seller = Fritz) | Turn (Seller = Hans) | Overall Turn |
| Chair | | 2 | 20 |
| Table | 5 | 4 | 20 |
| Total | 5 | 6 | 20 |

The result set of the database request containing data for the structure elements with object creation can be the following result set of Table 8.

TABLE 8

| | Result Set | |
|---|---|---|
| Product | Turn (Seller = Fritz) | Turn (Seller = Hans) |
| Chair | | 2 |
| Table | 5 | 4 |

The result set of the database request containing for the structure element without object creation has just one entry, as shown in the following result set of Table 9:

TABLE 9

| Result Set |
|---|
| Overall Turn |
| 20 |

A left outer join result of the above data sets can produce, for example, the result set of Table 10:

TABLE 10

| | Result Set | | |
|---|---|---|---|
| Product | Turn (Seller = Fritz) | Turn (Seller = Hans) | Overall Turn |
| Chair | | 2 | 20 |
| Table | 5 | 4 | 20 |

Note that the Overall Turn contains not only the turn of the products "Chair" and "Table", but also the turn of the product "Pen". But the structure elements with object generation don't generate source data for the product "Pen".

In another example, let the user select the structure elements "Turn (Seller=Fritz)" and "Overall Turn". As shown in the result set of Table 11, without the use of the "selective use of structure elements" setting, objects for the product Chair will still be generated by the structure element "Turn (Seller=Hans)" even if this structure element isn't selected. The database request and consequently their result sets are the same as without selecting structure elements.

TABLE 11

| | Result Set | |
|---|---|---|
| Product | Turn (Seller = Fritz) | Overall Turn |
| Chair | | 20 |
| Table | 5 | 20 |
| Total | 5 | 20 |

In another example, using the "selective use of structure elements" setting, only the structure element "Turn (Seller=Fritz)" would generate objects. This would also be the only structure element in the corresponding database request which has the following result set of Table 12:

TABLE 12

| | Result Set |
|---|---|
| Product | Turn (Seller = Fritz) |
| Table | 5 |

A left outer join result of the above data sets produces the result set of Table 13:

TABLE 13

| | Result Set | |
|---|---|---|
| Product | Turn (Seller = Fritz) | Overall Turn |
| Table | 5 | 20 |

The fact that Fritz doesn't contribute with Chairs to the overall turn is not visible in the result set anymore, as shown in Table 14:

TABLE 14

| | Result Set | |
|---|---|---|
| Product | Turn (Seller = Fritz) | Overall Turn |
| Table | 5 | 20 |
| Total | 5 | 20 |

To avoid the loss of information as shown in Table 14 compared to Table 11, an existing approach is that the query optimizer 118 just deactivates the "selective use of structure elements" in case a query contains structure elements without object generation. Deactivating the "selective use of structure elements" can have a negative impact on the query performance as outlined below.

In some implementations, the use of structure elements outside a filter can be expensive. For example, retrieving the data for a structure element can be expensive from the processing standpoint when additional characteristics need to be taken into the Group-By of the database request to be able to calculate the structure element in the query processor 116. One example of such a structure element is a structure element containing an exception aggregation that is performed inside the query processor 116. The query processor 116, for example, may need to request the data in the granularity of the exception aggregation reference characteristic from the database. Therefore, it needs to take the exception aggregation reference characteristic into the Group-By of the database request.

Another example is a structure element containing a key figure with a dynamic currency stored in a currency characteristic. In this example, the query processor 116 needs to request the data in the granularity of the currency characteristic to be able to do currency handling. Taking an additional characteristic into the Group-By of the database request increases the number of lines returned by the database by a factor up to the distinct values of the characteristic. This obviously increases the database time. Further, the processing time inside the query processor 116 is increased, as each line has to be processed by the query processor 116. Therefore the structure element is expensive for the query processor 116.

As an example, the query in the example can contain the turn of the seller Fritz, the Overall Turn which is realized with a constant selection, and the maximum of the turn per country. The maximum of the turn per country can be defined as exception aggregation maximum with reference characteristic country. An example result set is shown in Table 15.

TABLE 15

Result Set

| Product | Turn (Seller = Fritz) | Overall Turn | MAX (Turn) OVER Country |
|---|---|---|---|
| Chair |  | 20 | 5 |
| Pen |  | 20 | 2 |
| Table | 5 | 20 | 9 |
| Total | 5 | 20 | 11 |

The data for the object creating structure elements has to be retrieved from the data base in the granularity of the characteristics Product and Country. This means the characteristics Product and Country are in the group-by clause of the request. Product is included in drill-down elements, and Country is an exception aggregation reference characteristic. The result set of this database request is in the following Table 16:

TABLE 16

Result Set

| Product | Country | Turn (Seller = Fritz) | Turn |
|---|---|---|---|
| Chair | DE |  | 2 |
|  | US |  | 5 |
| Pen | DE |  | 2 |
| Table | DE | 2 | 9 |
|  | US |  | 2 |

In this example, taking Country as an additional characteristic into the Group-By increases the number of lines returned by the database just by a factor of two (for the products chair and table). Of course, it could be also a much higher factor, but for simplicity it's just two in the example.

Now, referring to the result set of Table 17, assume the definition of a selection containing the structure elements "Turn (Seller=Fritz)" and "Overall Turn". As mentioned before, the "selective use of structure elements" setting can be deactivated by the query optimizer, because the selected structure element "Overall Turn" has a constant selection and doesn't create objects itself

TABLE 17

Result Set

| Product | Turn (Seller = Fritz) | Overall Turn |
|---|---|---|
| Chair |  | 20 |
| Pen |  | 20 |
| Table | 5 | 20 |
| Total | 5 | 20 |

The characteristic country will still be in the Group-By of the database request even the structure element "MAX (Turn) OVER Country" isn't shown. Structure elements outside the selection are just used for object creation, they aren't shown to the user.

In some implementations, solutions for optimizing query processing can be associated with various goals. For example, when the "selective use of structure elements" setting is used and not-selected structure elements are needed for object creation in the result set of a query, the query processor 116 should not disable the selection of structure elements. Instead the not-selected structure elements with object creation should be processed in a performance optimized way to create the necessary objects in the query result set.

In some implementations, solutions for making queries more efficient can include various aspects. For example, when a structure element is needed only for object creation in the query result set but not-selected for the query result set, then the structure element is not calculated by the query processor 116. This means that exception aggregation, currency handling and potentially other functions are not done for this structure elements. Consequently, no additional characteristics for the calculation of a structure element outside the selection need to be taken into the Group-By of the database request. Thus, the query optimizer 118 can treat not-selected structure elements with object creation in a special way instead of deactivating the "selective use of structure elements" setting. These structure elements are marked by the query optimizer 118 and no additional characteristics are taken into the Group-By of the database request for these structure elements.

Table 18 summarizes how various structure elements are (or are not) used during processing. For example, for as described above with reference to table 15, the structure element "MAX (Turn) OVER Country" is marked when it isn't selected. Consequently the characteristic "Country," which would be needed for the calculation of this structure element, isn't taken into the Group-By of the database request for the object creating structure elements. The structure element "MAX(Turn) OVER Country" can be called a contributing structure element, because it contributes to the object creation.

TABLE 18

Use of Structure Elements

|  | Turn (Seller = Fritz) | Overall Turn | MAX (Turn) OVER Country |
|---|---|---|---|
| Selection | Yes | Yes | No |
| Object creation | Yes | No | Yes |
| Contributing structure element: no additional characteristics in Group-By | No | No | Yes |

The result set of the database request for the object creating structure elements is now smaller, as shown in the result set of Table 19.

TABLE 19

| Result Set | | |
|---|---|---|
| Product | Turn (Seller = Fritz) | Turn |
| Chair |  | 7 |
| Pen |  | 2 |
| Table | 2 | 11 |

Due to the smaller database result set, the processing time in the database and the query processor 116 can be reduced. Based on this result set from the database, the query processor 116 is now able to generate the objects for the products "Chair", "Pen" and also "Table" in the query result set. The query processor 116, of course, isn't able to calculate a value for the structure element "MAX (Turn) OVER Country", because the data is not available in the granularity of the exception aggregation reference characteristic country. Together with the database result set (Table 20) for the not-object creating structure elements,

TABLE 20

| Result Set Overall Turn |
|---|
| 20 | the query processor 116 is now able to return the request query result set (Table 21).

TABLE 21

| Result Set | | |
|---|---|---|
| Product | Turn (Seller = Fritz) | Overall Turn |
| Chair |  | 20 |
| Pen |  | 20 |
| Table | 5 | 20 |
| Total | 5 | 20 |

FIG. 2 is a flowchart of an example method 200 for formulating and executing optimized queries according to an implementation. For clarity of presentation, the description that follows generally describes method 200 in the context of FIG. 1. However, it will be understood that the method 200 can be performed, for example, by any other suitable system, environment, software, and hardware, or a combination of systems, environments, software, and hardware as appropriate. For example, the query server 110 and/or its components can be used to execute the method 200.

At 202, a query is received. For example, the query server 110 can receive a query that a user has submitted using the query front end 132.

At 204 the logical intersection of the structures is build. In case of only one structure, the intersection is equal to the structure. For example, the query processor 116 can identify query structures, as described above with respect to result sets shown in Tables 2-19. In some implementations, when the query is received, the query can include or identify the structure elements, as described above, including identifying the type of data to be accessed in the query and the information to be provided in the result set for the query.

At 206, the query optimizer 118 determines if the "selective use of structure elements" is used. The query processor 116, before executing the query, can determine if executing the query includes using a selective use of structure elements setting that is set when executing the query is to be optimized by accessing only the data needed to for the selected structure elements.

At 208, the query optimizer sets the "object creation" property for the elements of the intersection. The "object creation" property is set for an element of the intersection only if all structure elements (intersection partners), the intersection element is based on, are object creating.

At 210, the query optimizer sets the "selection" property for the elements of the intersection. The "selection" property is set for an element of the intersection only if all structure elements (intersection partners), the intersection element is based, on are selected.

If the intersection contains selected elements without object creation (212), then for the not selected elements with object creation the property "contributing elements" is set at 214. For contributing elements no additional characteristics needed for the calculation of these elements are taken into the group-by clause when retrieving data from the data base.

At 216, the query optimizer sets the "selection" property for all elements of the intersection in case the "selective use of structure elements" isn't used.

At 218 the query processor requests the data needed for the selected and contributing elements of the intersection. The group-by clause of the request contains all characteristics in drill down and all characteristics additionally needed for the selected elements. At 220 the query processor calculates the query result set for the intersection of the requested structure elements based on the data returned by the data base. The query processor 116, for example, can identify certain data tuples in the database, e.g., including data from rows in the data set shown in Table 1. The query is executed, including using the optimized set of elements, including using the contributing elements in an optimized way, the optimized way including accessing data tuples with the smallest set of characteristics in the group-by clause needed to for object creation and calculation of the selected structure elements. For example, when the query processor runs the query, the query optimizer 118 can execute the query so that elements access tuples in the database that are necessary and with the smallest set of characteristics in the group-by clause sufficient for producing and calculating the objects included in the result set.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, example environment 100 may use processes with additional, fewer and/or different operations, so long as the methods remain appropriate.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   receiving a query for execution in a database;
   building a logical intersection of query structures associated with the received query;
   identifying, as selected, a set of structure elements associated with the query structures, wherein the set of structure elements is identified by the query, and wherein the set of structure elements is used for accessing, from the database, data tuples associated with the set of structure elements;
   determining that query execution is set to retrieve data only for structure elements identified as selected;
   setting an object creation property for each element of the logical intersection, where all structure elements associated with the element are object creating;
   setting a selection property for each of the elements of the logical intersection where all structure elements associated with the element are identified as selected;
   setting a contributing structure element property for each element of the logical intersection where the element lacks the object creation property; and
   requesting data needed for each element of the logical intersection with a set selection property and contributing structure element property.

2. The method of claim 1, further comprising removing from the set of structure elements one or more particular structure elements not contributing to a result set of received query.

3. The method of claim 1, wherein a structure element contains either a key figure and selections on multiple characteristics or a formula, wherein operands of the formula are other structure elements, and wherein the formula includes exception aggregation.

4. The method of claim 3, further comprising defining a particular aggregation rule for a particular characteristic of the multiple characteristics.

5. The method of claim 4, further comprising calculating the formula before aggregating over the particular characteristic.

6. The method of claim 5, further comprising aggregating the results of the formula using the particular aggregation rule.

7. The method of claim 3, wherein no additional characteristics are used when retrieving data from the database during calculation of each element of the logical intersection with a set contributing structure element property.

8. A non-transitory, computer-readable medium storing one or more instructions executable by a computer system to perform operations comprising:
   receiving a query for execution in a database;
   building a logical intersection of query structures associated with the received query;
   identifying, as selected, a set of structure elements associated with the query structures, wherein the set of structure elements is identified by the query, and wherein the set of structure elements is used for accessing, from the database, data tuples associated with the set of structure elements;
   determining that query execution is set to retrieve data only for structure elements identified as selected;
   setting an object creation property for each element of the logical intersection, where all structure elements associated with the element are object creating;
   setting a selection property for each of the elements of the logical intersection where all structure elements associated with the element are identified as selected;
   setting a contributing structure element property for each element of the logical intersection where the element lacks the object creation property; and
   requesting data needed for each element of the logical intersection with a set selection property and contributing structure element property.

9. The non-transitory, computer-readable medium of claim 8, further comprising one or more instructions to remove from the set of structure elements one or more particular structure elements not contributing to a result set of the received query.

10. The non-transitory, computer-readable medium of claim 8, wherein a structure element contains either a key figure and selections on multiple characteristics or a formula, wherein operands of the formula are other structure elements, and wherein the formula includes exception aggregation.

11. The non-transitory, computer-readable medium of claim 10, further comprising one or more instructions to define a particular aggregation rule for a particular characteristic of the multiple characteristics.

12. The non-transitory, computer-readable medium of claim 11, further comprising one or more instructions to calculate the formula before aggregating over the particular characteristic.

13. The non-transitory, computer-readable medium of claim 12, further comprising one or more instructions to aggregate the results of the formula using the particular aggregation rule.

14. The non-transitory, computer-readable medium of claim 10, wherein no additional characteristics are used when retrieving data from the database during calculation of each element of the logical intersection with a set contributing structure element property.

15. A computer-implemented system, comprising:
   a computer memory; and
   a hardware processor interoperably coupled with the computer memory and configured to perform operations comprising:
      receiving a query for execution in a database;
      building a logical intersection of query structures associated with the received query;
      identifying, as selected, a set of structure elements associated with the query structures, wherein the set of structure elements is identified by the query, and wherein the set of structure elements is used for accessing, from the database, data tuples associated with the set of structure elements;
      determining that query execution is set to retrieve data only for structure elements identified as selected;
      setting an object creation property for each element of the logical intersection, where all structure elements associated with the element are object creating;
      setting a selection property for each of the elements of the logical intersection where all structure elements associated with the element are identified as selected;
      setting a contributing structure element property for each element of the logical intersection where the element lacks the object creation property; and
      requesting data needed for each element of the logical intersection with a set selection property and contributing structure element property.

16. The computer-implemented system of claim 15, further configured to remove from the set of structure elements one or more particular structure elements not contributing to a result set of the received query.

17. The computer-implemented system of claim 15, wherein a structure element contains either a key figure and selections on multiple characteristics or a formula, wherein operands of the formula are other structure elements, and wherein the formula includes exception aggregation.

18. The computer-implemented system of claim 17, further configured to define a particular aggregation rule for a particular characteristic of the multiple characteristics.

19. The computer-implemented system of claim 18, further configured to:
   calculate the formula before aggregating over the particular characteristic; and
   aggregate the results of the formula using the particular aggregation rule.

20. The computer-implemented system of claim 17, wherein no additional characteristics are used when retrieving data from the database during calculation of each element of the logical intersection with a set contributing structure element property.

* * * * *